Figure 1:
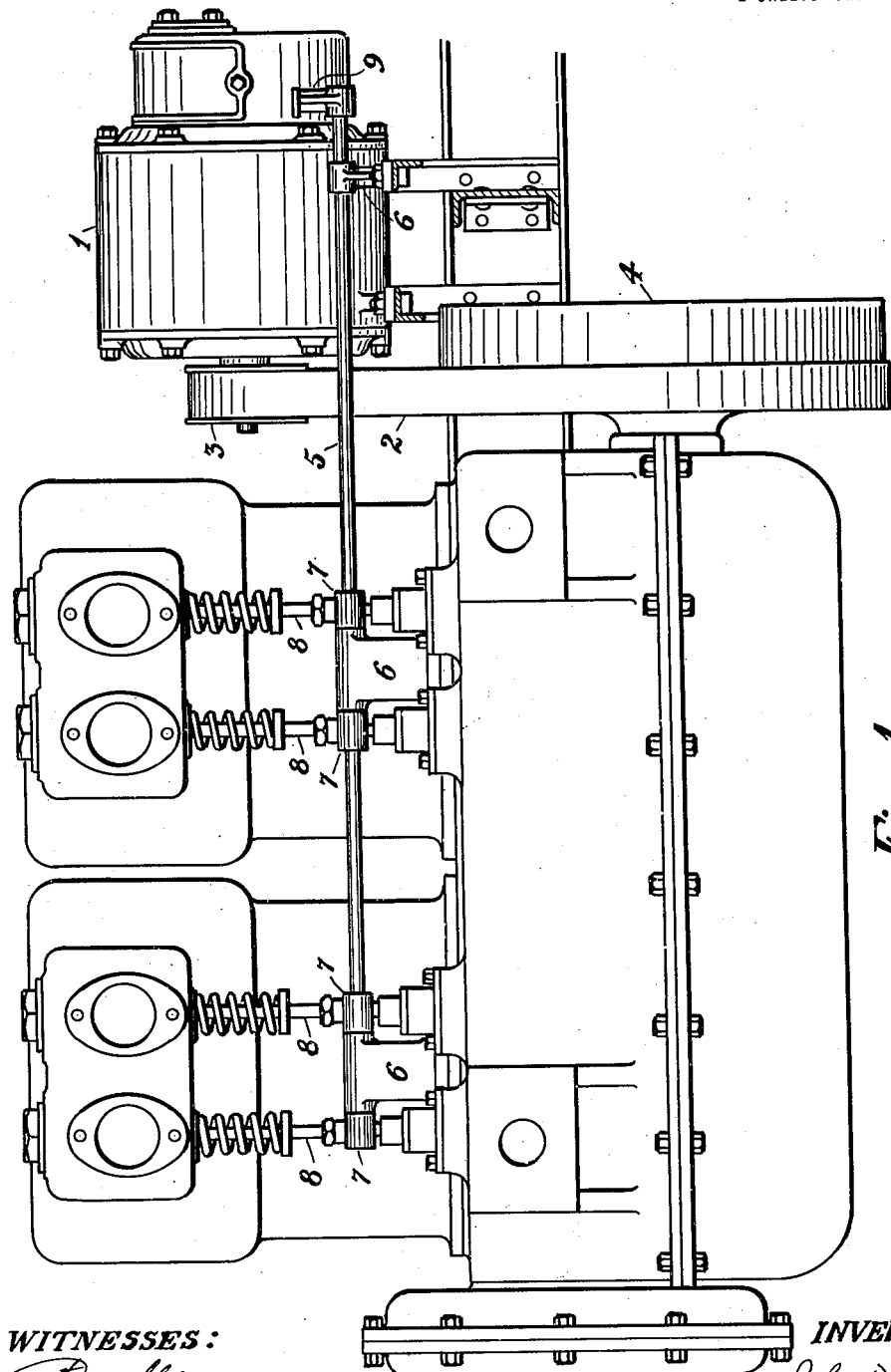

J. D. TAYLOR, DEC'D.
M. E. TAYLOR, EXECUTRIX.
COMBINED GAS ENGINE STARTER AND ELECTRIC GENERATOR.
APPLICATION FILED MAY 20, 1913.

1,140,011.

Patented May 18, 1915.
2 SHEETS—SHEET 2.

WITNESSES:

INVENTOR:
John D. Taylor

UNITED STATES PATENT OFFICE.

JOHN D. TAYLOR, OF WILKINSBURG, PENNSYLVANIA; MARY E. TAYLOR EXECUTRIX OF SAID JOHN D. TAYLOR, DECEASED.

COMBINED GAS-ENGINE STARTER AND ELECTRIC GENERATOR.

1,140,011.   Specification of Letters Patent.   Patented May 18, 1915.

Application filed May 20, 1913. Serial No. 768,729.

*To all whom it may concern:*

Be it known that I, JOHN D. TAYLOR, a citizen of the United States, residing at Wilkinsburg, in the county of Allegheny and State of Pennsylvania, have invented certain new and useful Improvements in Combined Gas-Engine Starters and Electric Generators, of which the following is a specification.

My invention relates to apparatus driven by an internal combustion engine, for the generation of electricity and for starting the engine, the object being to effect these results in a very simple manner, to maintain a nearly constant generated current, notwithstanding that the engine driving the generator may have a very variable speed, and to keep the current at constant value by means of apparatus which is otherwise useful.

My invention is particularly applicable for use in connection with automobiles and in describing the invention herein, I shall assume that it is used for lighting automobile lamps and for starting automobile engines; the electrical machine which at one time has the function of motor and at another time that of generator, being geared to the engine which propels the automobile.

Various arrangements of apparatus for accomplishing these results are now employed, but all with which I am familiar require that two or more separate pieces of apparatus be geared to the engine and the means for maintaining constant current serves no other useful purpose.

In carrying out my invention I accomplish the desired objects by employing an electrical machine which may act either as motor or generator, its function depending on the speed of the engine with which it is geared. When acting as a generator it charges a storage battery, and when acting as a motor deriving current from the storage battery, it starts the engine from rest and assists it in rotation until the speed reaches such value that the counter electromotive force equals the electro-motive force of the storage battery. At this point the function changes from that of motor to that of generator as the speed of the engine increases. An excessive charging current is prevented by means of a motor in circuit between the generator and the battery. This motor is coupled to an air pump working against a pressure maintained constant by means of a safety valve. An air pump working against constant pressure requires a substantially uniform torque and a uniform torque produced by an electric motor requires a uniform current in the motor. The pump motor requires a certain minimum current which by proper adjustment and relation of the parts may be made equal to that proper for charging the storage battery. Any further increase in the electromotive force of the generator above that required to produce this current will be absorbed by the pump motor, which prevents the current rising above the value required to overcome the resistance of the air pressure. The pump and motor for driving it may be located at any convenient place on the automobile and are useful in supplying air pressure for inflating tires and for any other purpose for which air pressure may be required.

Figure 3:
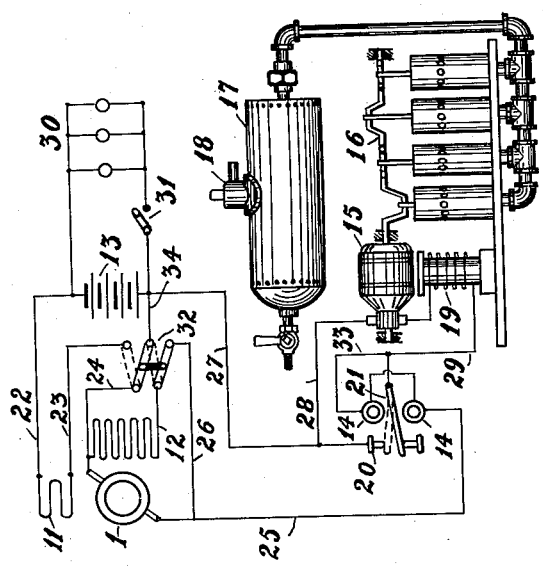
Figure 2:
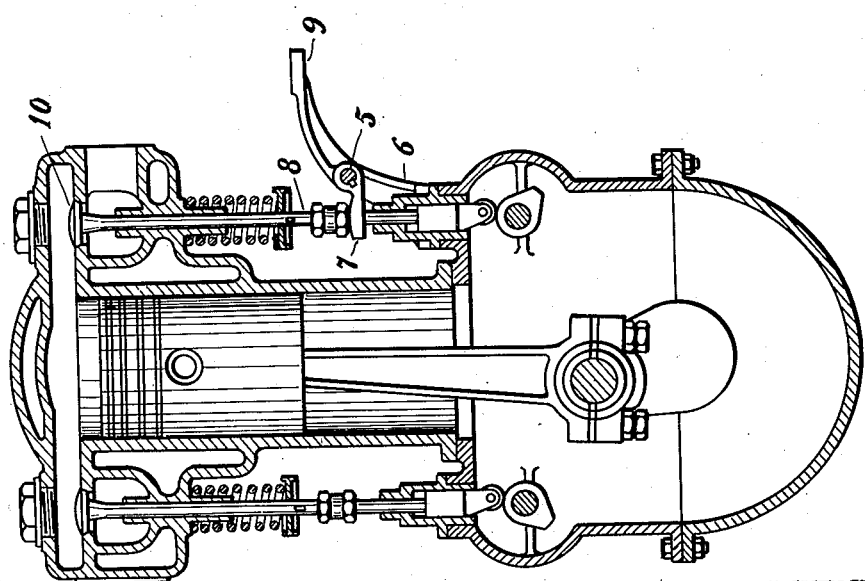

Figure 1 is a side elevation showing the application of an electrical machine in accordance with my invention to the driving engine of an automobile; Fig. 2 is a section through one cylinder of the engine transverse to the crank shaft showing means for lifting the exhaust valves and relieving the compression when starting the engine; Fig. 3 is a diagram of the electrical circuits and of the air pump and its connections.

For convenience in description, I will term the machine which has the functions of motor and generator, "the dynamo"; the machine which propels the automobile, "the engine"; and the machine which drives the air pump, "the motor." In Fig. 1 the dynamo 1 is supported on the frame of the automobile and is geared to the engine by means of a belt 2 passing around the pulley 3 on the dynamo shaft and the fly wheel 4 on the engine. The dynamo may be of any of the well-known types and needs no detailed description further than to say it is provided with a series field winding for strongly energizing the field magnet when the machine is used as a motor and a shunt field winding for maintaining the proper polarity when it is used as a generator.

The means for relieving the compression shown in Figs. 1 and 2 comprises a shaft 5 journaled in brackets 6, forked levers 7 engaging with the exhaust valve lift rods 8, and a lever 9 to be operated by the foot. When the engine is to be started the foot pedal 9 is depressed, which, through the medium of the shaft 5 and the forked levers 7, lifts the exhaust valves 10 off their seats and thus prevents compression of the air on the instroke of the engine. The purpose of this is to reduce the amount of current necessary to start the engine in motion. As soon as the dynamo 1 acquires normal speed the lever 9 may be released, when the exhaust valves 10 will resume their normal functions and the engine will start to work with its own power. The relief from the compression while not a necessity, is useful in avoiding the large drain of current which would otherwise result at the moment of starting.

I am aware that means for relieving the compression have been employed in connection with engines that have been started by hand, but the mechanism employed has been much more complicated than that herein shown. The apparatus for the purpose herein shown would not be applicable to a hand-started engine because while the exhaust valves are held open no fuel mixture can be taken into the cylinders, consequently the engine could not start. The purpose of the apparatus here is to permit speed to be developed with the minimum expenditure of energy after which the momentum of the fly wheel and the expansion of the compressed gases neutralize the retarding effects of the compression.

The air pump employed, shown diagrammatically in Fig. 3, may be of any well-known type and needs no detailed description further than to say that it should preferably have, at least, four cylinders so as to make the torque fairly uniform. With a four-cylinder pump the inertia of the motor armature 15 will keep the current required to drive the pump at a quite constant value even at very moderate speed.

For a detailed description of the operation reference will be made to Fig. 3. In this figure the full lines show the position of the controllers with the battery circuit open. To start the engine the double switch 32 will be put in the position shown by the dotted lines. Current will then flow from battery 13 through wire 22, series field coil 11, wire 23, upper arm of switch 32, wire 24, armature of generator 1, wire 25, coils of polarized controller 14, wires 33, 29, field coil 19, and armature 15 of the pump motor, wires 28 and 27 to battery 13. The current just traced through the coils 14 of the polarized controller causes its contact lever 21 to be put into the position shown by dotted lines, where it makes contact with the stop 20. This position of the contact lever 21 shunts out the pump motor, as the current after leaving the wire 33 passes through the contact lever 21, stop 20 and returns direct to battery 13 through wire 27. Current will also flow through the shunt coil 12 by way of lower arm of switch 32 and wire 34 to battery. The current through the dynamo 1 will start the engine which will then be driven by its own power. When the speed of the engine becomes great enough to cause the electro-motive force developed in the dynamo acting as a generator to exceed that of the battery, the current in the circuits above traced except that in the shunt field coil 12, will be reversed. The reverse current in the battery charges it and the reverse current in the coils 14 of the polarized controller causes the contact lever 21 to be moved to the position shown in full lines thus opening the shunt around the pump motor. The pump motor is thus included in the charging circuit and when the excess of the electro-motive force of the generator over that of the battery, becomes sufficient to produce current enough to cause the pump motor to drive the pump against the air pressure, it will begin to rotate and any further increase in generated electro-motive force, will result in increased speed of the pump motor without any increase in current.

The charging current passes through the series coil 11 in the direction to reduce the strength of the field magnetism, but this is beneficial rather than otherwise, as it tends to keep the charging current from becoming excessive. This current cannot reverse the field magnet because, to become reversed the magnetism would have to pass through zero, but long before it could reach this value the generated electro-motive force would pass through a value equal to the electro-motive force of the battery, at which point the current would pass through zero when it would have no effect on the series coil and full normal magnetization would be produced by current in the shunt coil 12.

The purpose of the polarized controller 14 is to shunt the pump motor out of the starting circuit and thus prevent its resistance reducing the starting current and to put the pump motor into the charging circuit so that its resistance will prevent excessive current.

The air pressure may be regulated by the safety valve 18 which may be adjusted to blow off at any desired pressure. To make the air pressure available for inflating tires, the safety valve should be adjusted to blow off at a pressure higher than that required in the tires. The pump and the gearing be tween it and the motor should be of such size and proportions that the current required to drive the pump will be suitable for charging the storage battery.

If a large quantity of air is required, the pump motor may be driven directly from the dynamo 1 by placing the switch 32 in the position shown by full lines. The current will flow from the dynamo 1 through wires 24, 34, 27, 28, armature 15, field 19, wires 29, 33, coils of polarized controller 14, wire 25 to dynamo 1. The shunt coil 12 is excited by means of its connection through the lower arm of the switch 32 and wire 26 with the armature of dynamo 1. The current through the coils 14 is in the right direction to hold the contact lever 21 in the full line position. The arrangement of circuits last described applies the full force of the generator to the pump motor, thereby quickly yielding a large quantity of compressed air.

Although I have herein shown and described only one form and arrangement embodying my invention, it is understood that various changes and modifications may be made therein within the scope of the appended claims without departing from the spirit and scope of my invention.

Having thus described my invention, what I claim is:

1. The combination of a variable speed engine, an electric dynamo operatively connected to said engine to either drive the same or to be driven thereby, a storage battery electrically connected to the said dynamo to either receive current from the dynamo or to furnish current to the dynamo, a motor connected in series between the dynamo and the battery, a constant load device connected to the motor, and automatic means for putting the motor into and out of operative circuit according to the action of the dynamo, substantially as described.

2. The combination of a variable speed engine, an electric dynamo operatively connected to said engine to either drive the same or to be driven thereby, a storage battery electrically connected to the said dynamo to either receive current from the dynamo or to furnish current to the dynamo, a motor connected in series between the dynamo and the battery, a constant load device connected to the motor, and means for automatically putting the motor into circuit when the electro-motive force developed in the dynamo running as a generator exceeds the electro-motive force of the battery, substantially as described.

3. The combination of a variable speed engine, an electric dynamo operatively connected to said engine to either drive the same or to be driven thereby, a storage battery electrically connected to the said dynamo to either receive current from the dynamo or to furnish current to the dynamo, a motor arranged to be driven by the dynamo when acting as a generator but normally inoperative, and means for putting the motor operatively into circuit when the electro-motive force developed in the generator exceeds that of the battery, substantially as described.

4. The combination of a variable speed engine, an electric dynamo operatively connected to said engine to either drive the same or to be driven thereby, a storage battery electrically connected to the said dynamo to either receive current from the dynamo or to furnish current to the dynamo, a motor arranged to be driven by the dynamo when acting as a generator but normally inoperative, and means for putting the motor operatively into circuit when the electro-motive force developed in the generator exceeds that of the battery, together with an air pump connected with said motor to be driven thereby, substantially as described.

5. The combination of a variable speed engine, an electric generator operatively connected thereto to drive said engine under certain conditions and to be driven by the engine under other conditions, a storage battery electrically connected to the said generator to receive current therefrom and also to furnish current thereto, and a motor and polarized controller in series between the generator and battery.

6. The combination of a variable speed engine, an electric generator operatively connected thereto to drive said engine under certain conditions and to be driven by the engine under other conditions, a storage battery electrically connected to the said generator to receive current therefrom and also to furnish current thereto, a motor in series between the generator and battery, a shunt around said motor, and a polarized controller for closing said shunt around the motor when the electro-motive force of the generator is less than that of the battery, and for opening the said shunt when the electro-motive force of the generator is greater than that of the battery.

7. The combination of a variable speed engine, an electric generator operatively connected thereto to drive said engine under certain conditions and to be driven by the engine under other conditions, a storage battery electrically connected to the said generator to receive current therefrom and also to furnish current thereto, a motor coupled to an air pump in series between the generator and battery, a shunt around said motor, and a polarized controller for controlling said shunt.

8. The combination of a variable speed engine, an electric generator operatively connected thereto to drive said engine under certain conditions and to be driven by the engine under other conditions, a storage battery electrically connected to the said generator to receive current therefrom and also to furnish current thereto, a motor coupled to an air pump in series between the generator and battery, a shunt around said motor, and a polarized controller in series with the motor between the generator and battery, for controlling said shunt.

In testimony whereof I affix my signature in presence of two witnesses.

JOHN D. TAYLOR.

Witnesses:
R. L. KISTLER,
A. HERMAN WEGNER.